United States Patent
Llamas Virgen et al.

(10) Patent No.: US 12,437,488 B2
(45) Date of Patent: Oct. 7, 2025

(54) AUGMENTING OBJECTS FOR IMMERSIVE GAMING ENVIRONMENTS

(71) Applicant: International Business Machines Corporation, Armonk, NY (US)

(72) Inventors: Paul Llamas Virgen, Guadalajara (MX); Romelia H. Flores, Keller (MX); Ana Paula Appel, São Paulo (BR); Utz Bacher, Dettenhausen (DE)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 18/473,374

(22) Filed: Sep. 25, 2023

(65) Prior Publication Data
US 2025/0104362 A1    Mar. 27, 2025

(51) Int. Cl.
*G06T 19/00*    (2011.01)
*A63F 13/52*    (2014.01)
*G06T 19/20*    (2011.01)

(52) U.S. Cl.
CPC ............ *G06T 19/006* (2013.01); *G06T 19/20* (2013.01); *G06T 2219/2012* (2013.01); *G06T 2219/2016* (2013.01); *G06T 2219/2021* (2013.01)

(58) Field of Classification Search
CPC ....... G06T 19/006; G06T 19/20; A63F 13/52; A63F 13/65; A63F 13/67; A63F 13/213
See application file for complete search history.

(56) References Cited

U.S. PATENT DOCUMENTS

| | | | |
|---|---|---|---|
| 7,206,000 B2 | 4/2007 | Zitnick, III | |
| 9,473,503 B2 | 10/2016 | Shuster | |
| 10,297,087 B2 | 5/2019 | Gervasio | |
| 10,445,941 B2 | 10/2019 | Niles | |
| 10,661,149 B2 | 5/2020 | Kudirka | |
| 10,796,494 B2 * | 10/2020 | Wright | G06T 19/20 |
| 10,928,974 B1 | 2/2021 | Gribetz | |
| 10,977,818 B2 | 4/2021 | Clark | |
| 11,132,067 B2 * | 9/2021 | Arana | A63F 13/213 |

(Continued)

FOREIGN PATENT DOCUMENTS

| | | |
|---|---|---|
| CN | 100594519 C | 8/2008 |
| CN | 109255832 A | 1/2019 |

(Continued)

OTHER PUBLICATIONS

"Method and System for Coordinating Movement between Virtual Reality (VR) Objects and Physical Objects", an IP.com Prior Art Database Technical Disclosure, IP.com No. IPCOM000260199D, IP.com Electronic Publication Date: Oct. 31, 2019, 4 pages, <https://priorart.ip.com/IPCOM/000260199>.

(Continued)

*Primary Examiner* — Sardis F Azongha
(74) *Attorney, Agent, or Firm* — Andre L. Adkins (57) ABSTRACT

Techniques are described with respect to a system, method, and computer program product for visualizing gaming virtual objects. An associated method includes analyzing a physical object within a physical space; rendering a virtual object associated with the physical object based on the analysis; optimizing the virtual object within a virtual environment associated with the physical space; and integrating the optimized virtual object into the virtual environment.

20 Claims, 6 Drawing Sheets

(56) References Cited

U.S. PATENT DOCUMENTS

| | | | | |
|---|---|---|---|---|
| 2017/0061700 | A1* | 3/2017 | Urbach | G02B 27/017 |
| 2018/0059783 | A1 | 3/2018 | Van Hoff | |
| 2018/0190034 | A1* | 7/2018 | Shapira | G06F 3/011 |
| 2020/0159388 | A1 | 5/2020 | Piya | |
| 2020/0342682 | A1 | 10/2020 | Wang | |

FOREIGN PATENT DOCUMENTS

| | | |
|---|---|---|
| CN | 110164233 A | 8/2019 |
| GB | 2417846 A | 3/2006 |
| GB | 2517008 A | 2/2015 |
| JP | 7189895 B2 | 7/2020 |
| WO | 2025/067956 A1 | 4/2025 |

OTHER PUBLICATIONS

"Perspectives from the Global Entertainment & Media Outlook 2023-2027: Resetting expectations, refocusing inward and recharging growth", PwC, Printed Jul. 11, 2023, 27 pages, <https://www.pwc.com/gx/en/industries/tmt/media/outlook/insights-and-perspectives.html>.

"Taking Selfie on Vimeo", Vimeo, Printed Jul. 11, 2023, 2 pages, <https://vimeo.com/441118844>.

Read, Simon, "Gaming is booming and is expected to keep growing. This chart tells you all you need to know", World Economic Forum, Jul. 28, 2022, 15 pages, <https://www.weforum.org/agenda/2022/07/gaming-pandemic-lockdowns-pwc-growth/>.

International Searching Authority, "Notification of Transmittal of the International Search Report and the Written Opinion of the International Searching Authority, or Declaration," Patent Cooperation Treaty, Dec. 2, 2024, 11 pages, International Application No. PCT/EP2024/075945.

Jesse Vander Does "Extend Your Phone Screen with the HoloLens", After Now, Mar. 1, 2017, 3 pages, Retrieved from the Internet: URL:https://web.archive.org/web/20201129050615/https://www.afternow.io/hololens-phone-controller/.

Saeghe et al.. "Augmenting Television With Augmented Reality", Proceedings of the 2018 ACM International Conference on Interactive Experiences for TV and Online Video, Jun. 4, 2019, pp. 255-261, DOI: 10.1145/3317697.3325129.

* cited by examiner

AUGMENTING OBJECTS FOR IMMERSIVE GAMING ENVIRONMENTS

FIELD

This disclosure relates generally to the field of augmented reality, and more particularly to augmenting objects in physical spaces for immersive gaming environments.

BACKGROUND

Virtual, augmented, mixed, and/or extended reality gaming is the integration of visual and/or multimedia content into virtual environments in real-time specifically for gaming. Traditionally, a user's physical environment is analyzed in order to generate a virtual environment derived from the analysis that include virtual elements superimposed in the virtual environment such as, but not limited to themes, virtual objects, avatars, virtual assistants, and the like. In particular, virtual gaming environments include virtual objects and in-game characters that interact with the user in order to facilitate components of the gaming experience. For example, the user may interact with a virtual object or in-game character within the virtual gaming environment that is necessary to pursue a conquest associated with the gaming experience such as interactive gameplay, instruction to the user, ascertaining contextual information, etc.

The virtual elements generated within the virtual environment may be rendered based on various factors such as, but not limited to gaming environment context, user information (e.g., data derived from the wearable device, user profiles, user inputs, etc.), the user's physical surroundings, and the like. In most cases, the applicable software application that is associated with the virtual objects is pre-programmed with not only types of virtual objects, but also specific responses of virtual objects when interacted with by the user. Therefore, generation of virtual objects in real-time based upon analyses of physical objects in the physical space is necessary.

SUMMARY

Additional aspects and/or advantages will be set forth in part in the description which follows and, in part, will be apparent from the description, or may be learned by practice of the invention.

Embodiments relate to a method, system, and computer readable medium for visualizing gaming virtual objects. In some embodiments, the computer-implemented method for visualizing gaming virtual objects includes analyzing a physical object within a physical space; rendering a virtual object associated with the physical object based on the analysis; optimizing the virtual object within a virtual environment associated with the physical space; and integrating the optimized virtual object into the virtual environment.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

In various aspects, the invention relates to a computer program product for visualizing gaming virtual objects, the computer program product comprising or more computer readable storage media and program instructions collectively stored on the one or more computer readable storage media, the stored program instructions comprising: program instructions to analyze a physical object within a physical space; program instructions to render a virtual object associated with the physical object based on the analysis; program instructions to optimize the virtual object within a virtual environment associated with the physical space; and program instructions to integrate the optimized virtual object into the virtual environment. As a result, illustrative embodiments provide a technical effect of improving the virtual experience of users in the gaming industry by rendering virtual objects that support a variety of functionalities manifested in the virtual environment in a scalable manner that reduces the necessary amount of computing resources.

In another aspect, the invention relates to a computer system for visualizing gaming virtual objects, the computer system comprising: one or more processors; one or more computer-readable memories; program instructions stored on at least one of the one or more computer-readable memories for execution by at least one of the one or more processors, the program instructions comprising program instructions to analyze a physical object within a physical space; program instructions to render a virtual object associated with the physical object based on the analysis; program instructions to optimize the virtual object within a virtual environment associated with the physical space; and program instructions to integrate the optimized virtual object into the virtual environment. As a result, illustrative embodiments provide a technical effect of improving the virtual gaming experience of users by rendering virtual objects that support a variety of functionalities manifested in the virtual environment based on a given gaming experience context in a scalable manner that reduces the necessary amount of computing resources.

In various aspects, the physical object is within the vicinity of a user operating on an augmented reality-based gaming system and the virtual environment is a virtual gaming environment. As a result, illustrative embodiments provide a technical effect of analyzing surroundings of the physical space of the user to render a gaming experience incorporating personalized features.

In various aspects, analyzing the physical object incorporates determining the physical object is a smart object and rendering at least one optimization for the virtual object derived from the smart object. As a result, illustrative embodiments provide a technical effect of rendering virtual objects that support features associated with the physical objects in the surrounding physical spaces which are manifested in the virtual gaming environment for a more personalized gaming experience.

In various aspects, optimizing the virtual object incorporates coupling the virtual object with the physical object to alter the virtual object in accordance to at least one of shape, size, color, form, and function of the physical object. As a result, illustrative embodiments provide a technical effect of optimizing rendering of virtual objects that integrate inherent characteristics of the physical object analyzed in the physical space; thus, providing a more personalized gaming experience for the user.

In various aspects, optimizing the virtual object incorporates determining a context associated with the virtual environment and adjusting the virtual object based on the context. As a result, illustrative embodiments provide a technical effect of continuously rendering optimization to virtual objects to be manifested in virtual gaming environments based upon analyses of the current gaming experience of the users; thus, providing an adaptive gaming experience for the user and a wider array of virtual object options.

In various aspects, the virtual object mimics characteristics of the physical object in the virtual environment. As a result, illustrative embodiments provide a technical effect of rendering a more personalized gaming experience based upon analyses of the physical space associated with the user and the elements, devices, etc. therein.

In various aspects, analyzing the physical object incorporates determining a position associated with the physical object in the physical space and correlating the virtual object within the virtual environment based on the position. As a result, illustrative embodiments provide a technical effect of monitoring the position of physical objects relative to the location of the user within a physical space and generating virtual gaming environments and virtual elements within based on the positioning; thus, providing a more personalized and interactive gaming experience.

The following described exemplary embodiments provide a method, computer system, and computer program product for visualizing gaming virtual objects. Virtual, augmented, mixed, and/or extended reality-based gaming involves utilizing artificial intelligence techniques, multiple sensors, advanced optics, holographic processing, and the like to provide users with an immersive gaming experience that supports superimposed virtual environments comprising virtual elements such as, but not limited to themes, virtual objects, avatars, virtual assistants, etc. Traditionally, the applicable software applications are pre-programmed with virtual elements configured to have not only pre-defined visual features, but also specific responses when interacted with by the user. For example, a virtual object within a virtual gaming environment may have a pre-defined appearance, and be limited to a predetermined set of functionalities (e.g., flashing, exploding, etc.). With the introduction of artificial intelligence techniques (e.g., cognitive mechanisms, computer visioning, gaming context determination, etc.) in the virtual gaming industry, physical objects within the physical space surrounding the user may be utilized as a blueprint for virtual objects integrated into generated virtual environments for the virtual gaming experience. Therefore, the present embodiments have the capacity to improve the virtual gaming experience by providing mechanisms to generate and visualize virtual objects based on physical objects detected within the physical vicinity of the user. In addition, the present embodiments have the capacity to optimize virtual objects by providing features and functionalities to virtual objects manifested in virtual environments which are generated based on various factors including, but not limited to gaming platform bandwidths, gameplay context, features of physical objects, and the like.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

As described herein, virtual reality ("VR") refers to a computing environment configured to support computer-generated objects and computer mediated reality incorporating visual, auditory, and other forms of sensory feedback. In addition, VR refers to technology that enables enhancement of user perception of a real-world environment through superimposition of a digital overlay in a display interface providing a view of such environment. It should be noted that a VR environment may be provided by any applicable computing device(s) configured to support a virtual, augmented, mixed, and/or extended reality user interacting with their surroundings.

As referred to herein, the physical space of the user may be the real-world surroundings of the user, comprised of all the physical elements of the user's location such as the earth, the air, the sky, physical objects. The virtual environment may be the virtual surroundings of the user, which is to say all virtual elements, including virtual objects, rendered by a processor on specialized display hardware that a user can see and/or interact with.

As described herein, a physical object refers to any applicable article, item, or collection of matter detected within the physical surrounding space associated with a user donning a computer-mediated reality device. Physical objects as described herein may be either "smart" or "non-smart", in which a "smart" physical object comprises at least one sensor and/or processor, and a "non-smart" object is free of at least one sensor and/or processor.

As described herein, virtual objects may be an object of any shape, size, position, material composition, etc. integrated into the virtual environment, often mimicking or simulating a physical object, that is simulated via software within the virtual environment, such as visual interfaces of applications, computer-generated text or symbols or pictures or objects overlaid onto the user's sight, a game environment that the user is viewing through a computer-mediated reality device, etc.

As described herein, optimization of a virtual object refers to providing one or more features or functionalities to the virtual object configured to be manifested in the virtual gaming experience of the user. For example, a virtual object in the virtual environment may be optimized resulting in the virtual object becoming a prop, weapon, etc. to be used by the user against adversaries in the gaming experience.

Figure 1:
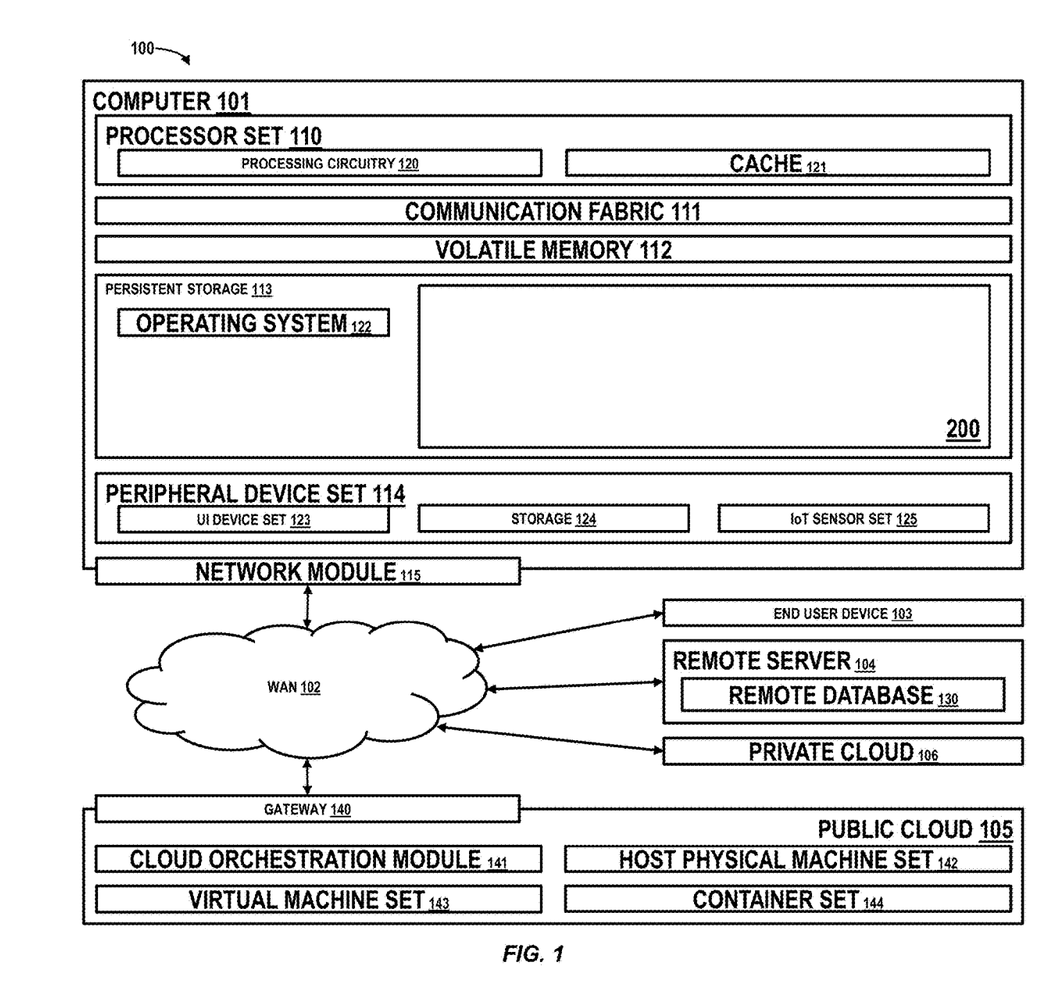
FIG. 1 illustrates a networked computer environment, according to an exemplary embodiment.

The following described exemplary embodiments provide a system, method, and computer program product for visualizing gaming virtual objects. Referring now to FIG. 1, a computing environment 100 contains an example of an environment for the execution of at least some of the computer code involved in performing the inventive methods, such as system 200. In addition to system 200, computing environment 100 contains an example of an environment for the execution of at least some of the computer code involved in performing the inventive methods. Computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and system 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, computer-mediated reality device (e.g., AR/VR headsets, AR/VR goggles, AR/VR glasses, etc.), mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) payment device), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD payment device. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter payment device or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
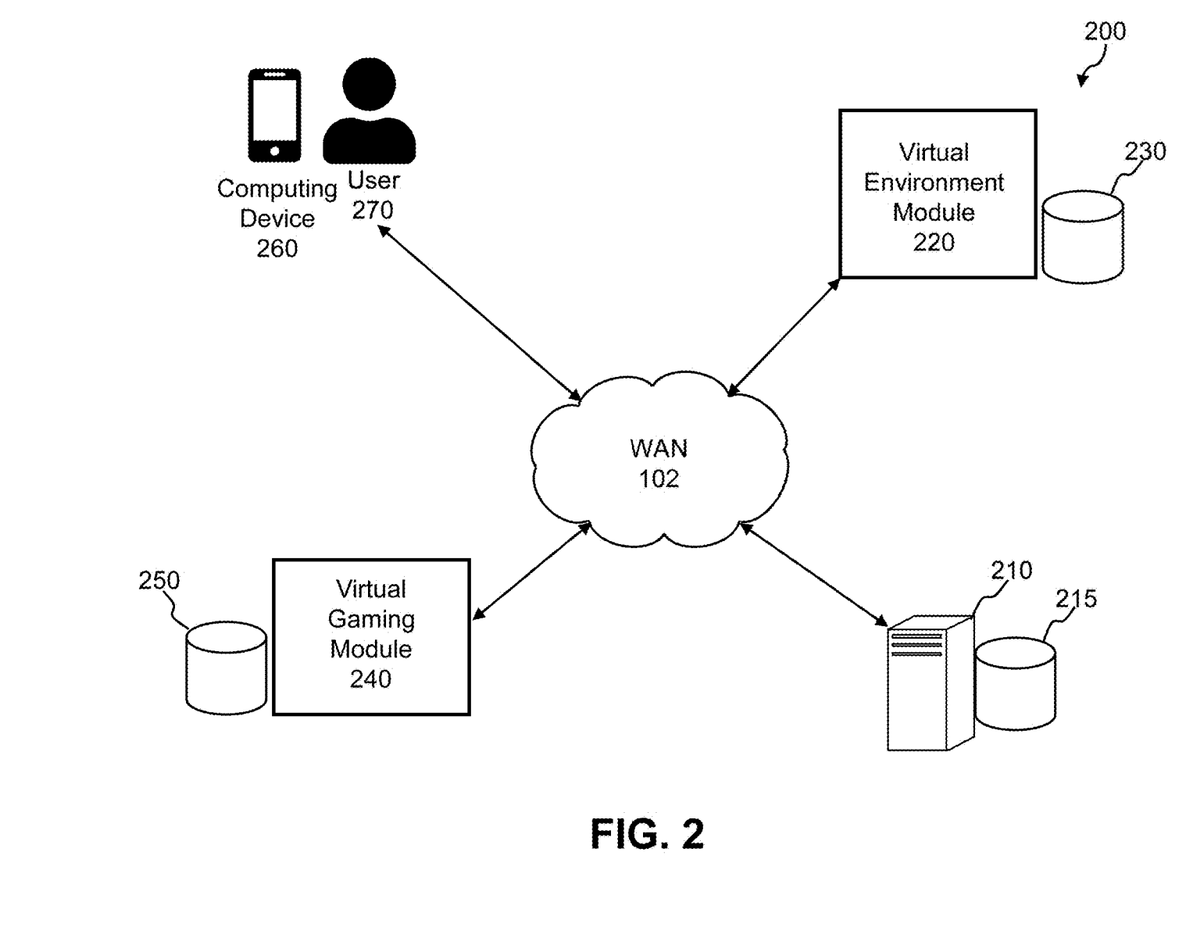
FIG. 2 illustrates a block diagram of a virtual object optimization system environment, according to an exemplary embodiment.

Referring now to FIG. 2, a functional block diagram of a networked computer environment illustrating a computing environment for visualizing gaming virtual objects system 200 (hereinafter "system") comprising a server 210 communicatively coupled to a database 215, a virtual environment module 220, a virtual environment analysis database 230, a virtual gaming module 240, a virtual gaming module database 250, and a computing device 260 associated with a user 270, each of which are communicatively coupled over WAN 102 (hereinafter "network") and data from the components of system 200 transmitted across the network is stored in database 215.

In some embodiments, server 210 is configured to operate a centralized platform serving as a cloud-based virtual object rendering, visualizing, and optimizing mechanism configured for virtual gaming environments. Server 210 may also be a gaming server configured to provide the gameplay experience in addition to a mechanism for user 270 to provide user inputs and establish preferences for virtual object aesthetics, features, and/or functionalities along with privacy settings, and the like via accessing one or more user interfaces and application programming interfaces (APIs) provided to computing device 260. It should be noted that the platform is further configured to dynamically create or change features/functionalities of virtual objects based on various factors associated with the gaming experience including, but not limited to gameplay trajectory, context, mode, bandwidth, or any other applicable gameplay factors known by those of ordinary skill in the art. For example, the applicable sensors associated with system 200 may detect a pen within the vicinity of user 270 in the surrounding physical space, in which modules of system 200 discussed throughout are able to determine a first context of a gaming session resulting in the pen being rendered as a first virtual object in the form of a torch or flashlight in a dark cave user 270 is traversing; then the pen may be rendered as a second virtual object in the form of a sword (i.e., sword) based on transitioning to a second context where user 270 must duel.

Virtual environment module 220 is configured to not only analyze virtual environments in order to ascertain associated gaming contexts, but also analyze both virtual elements and non-virtual elements of the virtual environments such as utterances, gestures, and other applicable events transpiring during the gaming sessions. For example, virtual environment module 220 analyzing a gameplay experience of user 270 may allow virtual environment module 220 to ascertain not only the type of virtual environment currently being depicted to user 270 on computing device 260, but also the virtual elements within the virtual environment (e.g., current themes, in-game characters, props, gameplay missions/assignments, etc.) along with the context associated with the current gameplay experience. Virtual environment module 220 is designed to utilize artificial intelligence techniques such as but not limited to, natural language processing (NLP), linguistics analysis, image analysis, topic identification, virtual object recognition, setting/environment classification, and any other applicable artificial intelligence and/or cognitive-based techniques in order to analyze virtual environments and elements within and store analyses in virtual environment analysis database 230. Virtual environment module 220 is also designed to utilize one or more sensors systems to detect physical objects and subsequently classify the physical objects as "smart" objects or "non-smart" objects. Virtual environment module 220 is further tasked with providing techniques that facilitate automatic, reliable performance of a point cloud object-environment segmentation task in order to analyze virtual environments and render virtual elements. Furthermore, virtual environment module 220 provides the functionality to visualize the digital objects along with their optimizations within the virtual environments configured to be presented to computing device 260 during the gameplay experiences.

Virtual gaming module 240 is tasked with not only ascertaining contexts of virtual environments presented during the gameplay experience, but also perform coupling of physical objects to virtual objects which results in the rendering of optimizations of the digital objects based on the given context. Furthermore, virtual gaming module 240 is configured to maintain virtual object profiles associated with the virtual objects which are stored in virtual gaming module database 250. The virtual object profiles are configured to indicate the source the virtual object is derived from (i.e., physical object), whether the virtual object is smart or non-smart, the features/functionalities of the virtual object, and any other applicable virtual object characteristics known to those of ordinary skill in the art. In some embodiments, virtual gaming module 240 is designed to utilize artificial intelligence techniques such as but not limited to, natural language processing (NLP), linguistics analysis, image analysis, topic identification, virtual object recognition, and the like to ascertain contexts, coupling relationships, optimization prediction, etc. For example, virtual gaming module 240 may utilize one or more of the aforementioned techniques to ascertain that user 270 is traversing a virtual environment that requires a combat, conquest, discussions, etc. which determines the type of virtual object that is rendered in light of the physical object that is detected in the physical space. In some embodiments, virtual gaming module 240 performs analysis of user 270 via electromyography (EMG), which is a diagnostic and analysis technique for evaluating and recording electrical activity produced by muscle tissue sourced from computing device 260. Muscle tissue at rest is normally electrically inactive; however, electrical potentials appear when muscle tissue is contracted. Therefore, facial EMG can be used to analyze the activation of muscles located in the face. In particular, EMG and applicable body movement analyses (e.g., blinking, squinting, waving, etc.) may be utilized by virtual gaming module 240 to not only ascertain patterns associated with facial and body reactions of user 270 to various gaming scenarios, but also virtual gaming module 240 may determine which virtual object to render in the virtual gaming environment based on the ascertained sentiment of user 270 (e.g., a flashlight when there are indications that user 270 cannot see).

Computing device 260 may take the form of a desktop computer, laptop computer, tablet computer, smart phone, smart watch or other wearable computer, mainframe computer, computer-mediated reality (CMR) device/VR device, quantum computer or any other form of computer or mobile device now known or to be developed in the future that is capable of running a program, accessing a network, or querying a database. It should be noted that in the instance in which computing device 260 is a CMR device (e.g., VR headset, AR goggles, smart glasses, etc.) or other applicable wearable device, computing device 260 is configured to collect sensor data via one or more associated sensor systems including, but are not limited to, cameras, microphones, position sensors, gyroscopes, accelerometers, pressure sensors, cameras, microphones, temperature sensors, biological-based sensors (e.g., heartrate, biometric signals, etc.), a bar code scanner, an RFID scanner, an infrared camera, a forward-looking infrared (FLIR) camera for heat detection, a time-of-flight camera for measuring distance, a radar sensor, a LiDAR sensor, a temperature sensor, a humidity sensor, a motion sensor, internet-of-things ("IOT") sensors, or any other applicable type of sensors known to those of ordinary skill in the art.

Figure 3:
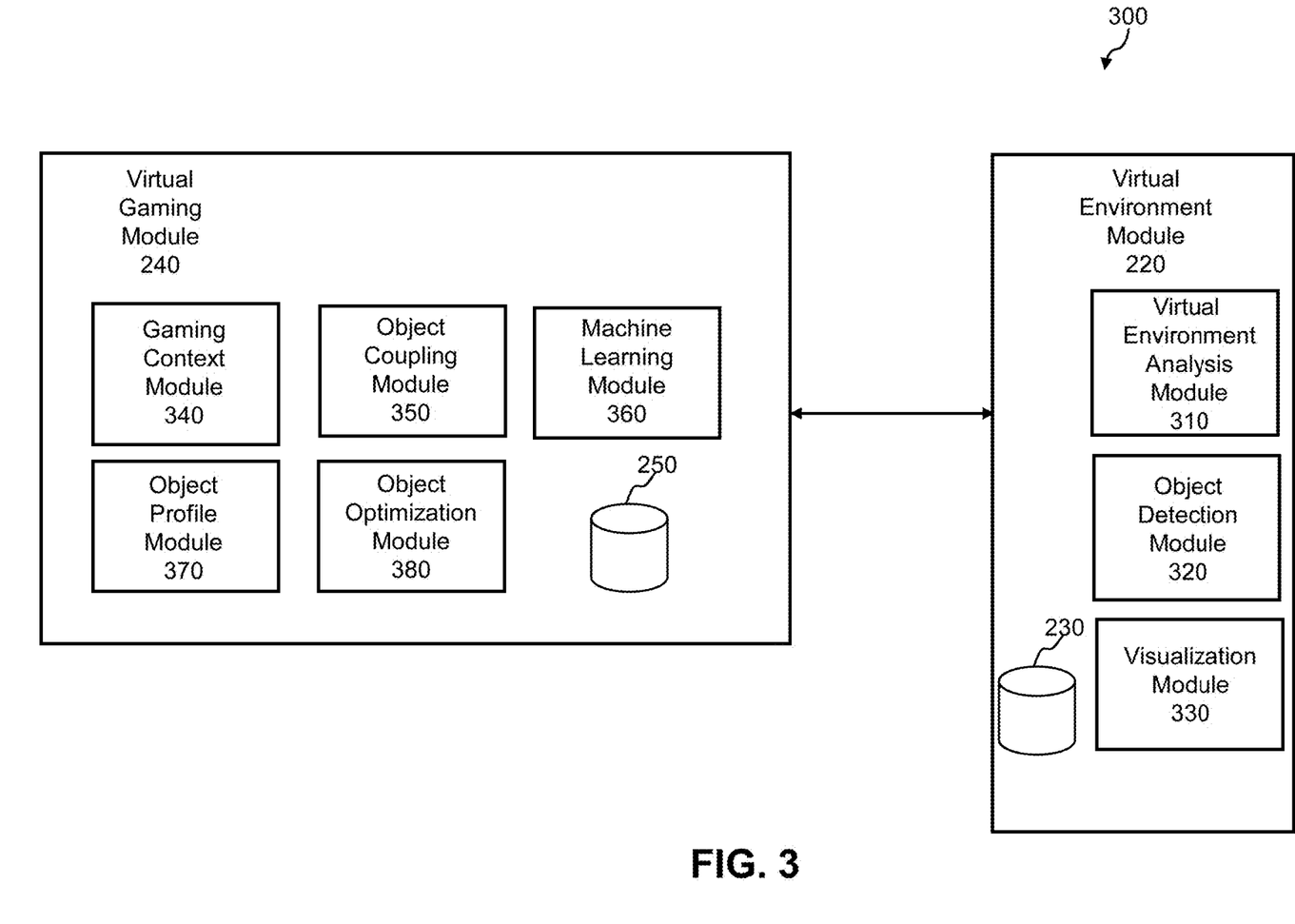
FIG. 3 illustrates a virtual environment module and a virtual gaming module associated with the system of FIG. 1, according to an exemplary embodiment.

Referring now to FIG. 3, an example architecture 300 of virtual environment analyzer module 220 and virtual gaming module 240 is depicted, according to an exemplary embodiment. Virtual environment analyzer module 220 comprises a virtual environment analysis module 310, an object detection module 320, and a visualization module 330. Virtual gaming module 240 comprises a gaming context module 340, an object coupling module 350, a machine learning module 360, an object profile module 370, and an object optimization module 380. The aforementioned modules are designed to be communicatively coupled allowing transmitting of applicable data among each other over the network.

Virtual environment analysis module 310 is tasked with analyzing virtual environments in order to ascertain virtual elements such as virtual objects, virtual environment themes, patterns, avatars, virtual agents, factors associated with computing device 260 such as but not limited to physical surroundings (e.g., architectures, time periods/time of day, etc.), geographic location, linguistic inputs, speech patterns, gestures, and the like. Virtual environment analysis module 310 may analyze a given virtual environment in order to ascertain whether the virtual environment pertains to one or more gameplay experiences of user 270, a lobby/meeting place for gamers, an interactive push-notification presented in a virtual environment, etc. For example, virtual environment analysis module 310 analyzing linguistic inputs of avatars associated with gamers in the virtual environment pertaining to the load time associated with a gaming map allow virtual environment analysis module 310 to not only determine that user 270 is waiting for a gaming map and its components to load in a waiting room while wielding a weapon (e.g., detected via object detection techniques), but also inform virtual gaming module 240 that the weapon should be converted into a mechanism to advertise a promotional offer (e.g., virtual document advertising acquirable gameplay features for purchase). In some embodiments, body movements and gestures associated with user 270 occurring proximate to computing device 260 may allow virtual environment analysis module 310 to ascertain the context of the physical and/or virtual environment associated with user 270. For example, if user 270 is participating in an E-Sport event and observes the fellow spectating avatars jumping and cheering due to the excitement of the AR gaming experience, then EMG-based analysis of facial movements of user 270 indicates user 270 is excited and virtual environment analysis module 310 is able to ascertain the context that something favorable has happened for user 270 during the gameplay session. It should be noted that virtual environment analysis module 310 may utilize image/video analysis, parsing, tokenizing, 3D point cloud segmentation, virtual object detection, theme identification, or any other applicable VR/AR-based analysis mechanisms known to those of ordinary skill in the art. In addition, virtual environment analysis module 310 may utilize natural language processing and other applicable cognitive-based techniques in order to process linguistic inputs of user 270 and others applicable avatars within the given virtual environment.

Object detection module 320 is tasked with identifying and classifying physical objects within one or more physical spaces and/or virtual environments associated with user 270. It should be noted that object detection module 320 is configured to utilize camera-based object facial detection, computer vision, LIDAR, LADAR, RFID tags, GPS, accelerometers, tracking/monitoring techniques, etc. in order to continuously monitor physical, virtual, and/or mixed spaces for changes to the aforementioned environments. The present invention may contain various accessible data sources, such as database 215, that may include personal and/or confidential company data, content, or information the user wishes not to be processed. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal and/or confidential company data. Server 210 enables the authorized and secure processing of personal data. Server 210 provides informed consent, with notice of the collection of personal and/or confidential company data, allowing the user to opt in or opt out of processing personal and/or confidential company data. Consent can take several forms. Opt-in consent can impose on the user to take an affirmative action before personal and/or confidential company data is processed. Alternatively, opt-out consent can impose on the user to take an affirmative action to prevent the processing of personal and/or confidential company data before personal and/or confidential company data is processed. Server 210 provides information regarding personal and/or confidential company data and the nature (e.g., type, scope, purpose, duration, etc.) of the processing. Server 210 provides the user with copies of stored personal and/or confidential company data. Server 210 allows the correction or completion of incorrect or incomplete personal and/or confidential company data. Server 210 allows for the immediate deletion of personal and/or confidential company data.

Object detection may be accomplished via a variety of mechanisms such as, but not limited to real-time environment scanning, monitoring systems, computer vision system, CCTV systems, and any other applicable mechanism configured to communicate with, support, or interact with computing device 260 and its applicable sensors. For example, it is common for AR users to create, manipulate, and/or interact with physical objects in a physical space or virtual objects within a virtual environment. Thus, whenever user 270 creates, deletes, or edits a virtual object, modifies the settings or conditions, moves around beyond a threshold margin such that physical and virtual objects are at new locations relative to user 270, changes a physical object such as by moving the physical object in the physical space, or modifies the shape, orientation, color, etc. of a virtual object, object detection module 320 accounts for and notes the modification from the acquired sensor data for storage in virtual environment analysis database 230. In addition, object detection module 320 may also account for various characteristics and impacts associated physical and virtual objects such as, but not limited to visual effects, amplitude, frequency, coloring, shading, etc. associated with the aforementioned based on the relative location and context associated with user 270.

In some embodiments, object detection module 320 is configured to classify physical objects in physical spaces, in which smart object comprises at least one sensor or processor and a non-smart object is free of at least one sensor or processor. Object detection module 320 may determine a tag for physical objects based on the classification. For example, an apple detected within a physical space may be classified as a non-smart object due to the lack of sensors and/or processors, in which object detection module 320 tags the apple with metadata indicating the classification. It should be noted that the tagging may also be indicative of other characteristics associated with the apple including, but not limited to color, weight, shape, functions/capabilities, opinion of user 270 (e.g., dislike or preference), and the like. In some embodiments, the applicable tags of a physical object may be taken into account by gaming context module 340 in order to determine a context for the object to be used within a gaming experience and/or object optimization module 380 in order to apply the functionalities that may be applied to the virtual object derived from the physical object.

Visualization module 330 is tasked with rendering and depicting physical and/or virtual objects within virtual environments for the gaming experience associated with user 270. In some embodiments, visualization module 330 utilizes a generative adversarial networks (GANs) and/or any other applicable VR/AR content mechanisms configured to support dynamic virtual content generation/modification. Visualization module 330 is further configured for creating 3D scenes, applying lighting and shading effects, and generating textures to make the virtual environment look realistic. Furthermore, visualization module 330 renders the virtual elements for shared themes in a scalable and sustainable manner by referencing applicable virtual elements stored in a digital objects library included within virtual environment analysis database 230; thus, reducing the amount of computing resources necessary for visualization module 330 to render individualized virtual environments for respective computing devices that the shared themes are presented to. Traditionally, virtual elements associated with a theme are rendered in a manner in which a significant amount of computing resources are necessary in order to generate a virtual environment with a shared theme scalable for multiple users operating across a cloud-based platform. However, visualization module 330 is configured to communicate with server 210 to coordinate allocation and distribution of virtual resources necessary for generating the virtual environment including the shared theme on-demand by virtual environment analysis module 310 tagging virtual elements from previously rendered virtual environments, and storing the virtual elements in virtual environment analysis database 230. In some embodiments, the virtual elements are tagged with metadata derived from the analyses of the detected physical objects, ascertained contexts, and/or theme of the applicable virtual environment allowing quick referencing when visualization module 330 is depicting virtual objects derived from detected physical objects in the vicinity of user 270 within the applicable physical space. Visualization module 330 integrates virtual objects and/or optimized virtual objects into the virtual gaming environment, in which some embodiments the virtual objects are integrated based upon the ascertained context.

Gaming context module 340 is tasked with determining a gaming context derived from the gaming experience presented to user 270 via computing device 260. It should be noted that the gaming context may be an import factor taken into consideration in virtual gaming module 240 determining the features and functionalities applied to the virtual object. In some embodiments, a change in a given context associated with a gaming environment and/or experience may result in gaming context module 340 adjusting one or more components of a virtual object in real-time. For example, if gaming context module 340 determines that a first gaming context of a gaming experience associated with user 270 involves a duel then the virtual object may initially be a weapon, and subsequently when gaming context module 340 determines that a second gaming context is a traversal of a game map in which the virtual object is adjusted into a lit candle and/or flashlight. Gaming context module 340 is further configured to determine a context of a gaming experience based on not only the interactions between user 270 and the virtual object, but also the environment conditions associated with the virtual object. For example, gaming context module 340 may analyze the gestures of user 270 associated with the virtual object in relation to the gaming virtual environment in order to ascertain the gaming context. In addition, gaming context may be determined based on one or more of user trajectory determination, cost of initially rendering the virtual object (e.g., the determined cost does not exceed a minimum cost threshold which is predefined or determined as per an optimization analysis), cost of adapting the content necessary to render the virtual object (e.g., computing resource availability, bandwidth, etc.), and the like.

Object coupling module 350 is tasked with associating and/or correlating physical objects with virtual objects in order to facilitate optimization of the virtual objects within the virtual gaming environment. It should be noted that object coupling not only supports the classification and tagging of physical objects for assistance with rendering virtual objects for future gaming sessions, but also provides a foundation for data associated with physical objects that allows the options for virtual objects derived from a physical object to be exhaustive with regards to virtual gaming environments. For example, an apple may be detected in the physical space associated with user 270; however, the apple in the virtual gaming environment may take the form of a plurality of virtual objects determined based on one or more of the ascertained gaming context and the previous couplings associated with the apple determined by object coupling module 350. For instance, the apple may be correlated to a digital weapon because of its size and portability; however, the apple may also be correlated to a digital baseball in an E-sports matched based on previous gaming sessions of user 270 in which an apple was a detected physical object. Object coupling module 350 is further configured to uniquely identify properties of physical objects in order to verify associations between physical objects and virtual objects. In particular, gathering ascertainable data from smart (via applicable sensors) and non-smart (e.g., visual, physical, inherent characteristics data) objects allows objects within the proximity of user 270 to be accurately classified and in some instances object coupling module 350 communicates with server 210 and instructs server 210 to utilize one or more web crawlers to gather applicable data associated with physical objects. As a result, object coupling module 350 could identify associations between objects, and more specifically identify those associations that are considered improper based on a rule, specification, or the like dictating what is improper; thus, dictating what constitutes an improper association between detected objects and derived virtual objects. The coupling may be taken into consideration in order to alter the virtual object within the virtual gaming environment in accordance to at least one of shape, size, color, form, and function of the physical object. In some embodiments, object coupling module 350 communicates with machine learning module 360 in order to provide datasets for machine learning models managed by machine learning module 360 configured to generate predictions associated with virtual objects.

Machine learning module 360 is configured to use one or more heuristics and/or machine learning models for performing one or more of the various aspects as described herein. In some embodiments, the machine learning models may be implemented using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, Siamese network ("twin neural network"), long short-term memory (LSTM), convolutional neural network (CNN), generative adversarial network (GAN), recursive neural network (RNN), sequence-to-sequence model, shallow neural network, multilayer perceptron (MLP), back propagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting, and any other applicable machine learning algorithms known to those of ordinary skill in the art. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure. In particular, machine learning module 360 is configured to operate and maintain one or more machine learning models configured to utilized training datasets derived from database 215, virtual environment analysis database 230, virtual gaming module database 250, and any other applicable data source, in which the one or more machine learning models are configured to generate outputs pertaining to virtual objects integrated into virtual gaming environments. For example, the one or more machine learning models comprising datasets having training data such as gaming context, object couplings, object profiles, virtual objects rendered in previous gaming experiences, and the like.

Object profile module 370 is designed to maintain object profiles associated with detected physical objects within physical spaces associated with user 270. The object profiles serve as digital records of the properties, metadata, and other applicable data associated with detected physical objects. It should be noted that one of the purposes of the object profile is to provide datasets for the one or more machine learning models maintained by machine learning module 360 in order to generate predictions of virtual objects for virtual gaming environments. For example, based on analyses of the detected apple, the derived virtual object may be a manifestation of a prediction of the one or more machine learning models indicating that the apple is a source of nutrition for the gameplay character associated with user 270 integrated into the virtual gaming environment as a virtual apple to be consumed by the gameplay character. In some embodiments, the object profiles are continuously updated with information pertaining to the respective physical objects derived from internet-based data sources, social media platforms, digital manuals, and any other applicable data sources known to those of ordinary skill in the art.

Object optimization module 380 is tasked with optimizing virtual objects that are visualized and integrated into the virtual gaming environments. Object optimization module 380 may communicate with machine learning module 360 to utilize GANs in order to render the optimizations to the virtual objects. For example, virtual environment analysis module 310 may detect an artificial plant in a physical space associated with user 270, in which initially a virtual plant derived from the artificial plant is integrated into a first virtual gaming environment depicted to computing device 260. However, object optimization module 380 may optimize the virtual plant and visualize it into an in-game character (e.g., ally, adversary, and the like) configured to interact with user 270 within a second virtual gaming environment. As previously described, optimization of a virtual object refers to providing one or more features or functionalities to the virtual object configured to be manifested in the virtual gaming experience of the user. Furthermore, optimization by object optimization module 380 may also comprise adding visual/audio effects to virtual objects including, but not limited to flashing, glowing, talking, and any other applicable virtual object modifications known to those of ordinary skill in the art.

Figure 4:
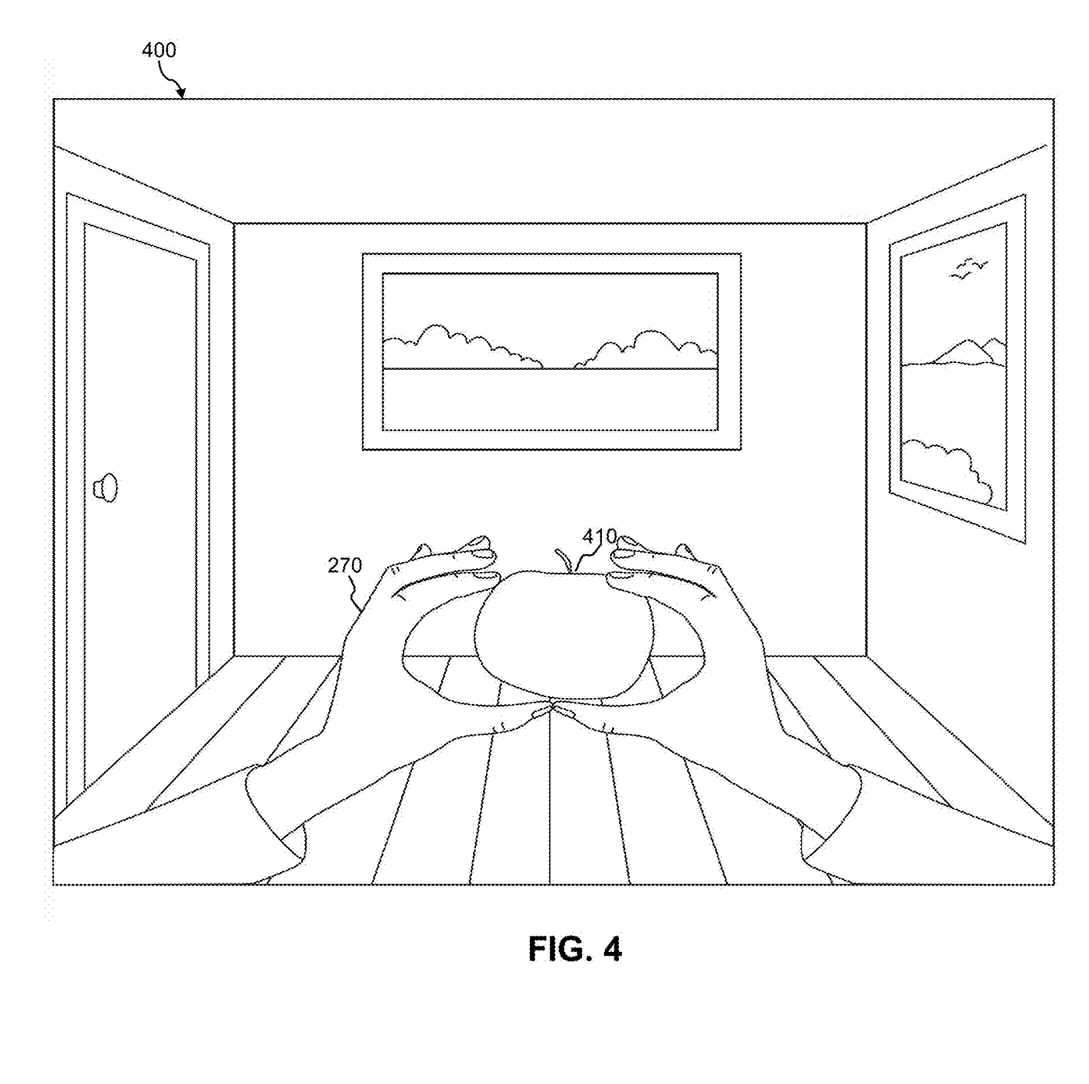
FIG. 4 illustrates a schematic diagram showing a physical space including a user associated with the system of FIG. 1 in possession of a physical object, according to an exemplary embodiment.

Referring now to FIG. 4, a physical space 400 comprising a physical object 410 is depicted, according to exemplary embodiment. As illustrated, user 270 is viewing physical space 400 while donning computing device 260 (not shown) allowing object detection module 320 to perform continuous scanning of physical space 400 in order to detect physical object 410. Upon physical object 410 being detected, object detection module 320 and object coupling module 350 simultaneously analyzes physical object 410 in order ascertain properties, classification information (e.g., smart or non-smart device), metadata, the like. The aforementioned collected data is utilized by object profile module 370 to generate the object profile associated with physical object 410. In some embodiments, the virtual object mimics characteristics of physical object 410 within the virtual environment. For example, the virtual object in the virtual gaming environment is an apple mimicking physical object 410 configured to nourish the in-game character associated with user 270.

Physical objects are generally within the vicinity of user 270 not only allowing object detection module 320 to detect them, but also signals associated with applicable smart objects to be detected by computing device 260 allowing proper classification of the physical objects. Updated data associated with physical object 410 is continuously integrated into the object profile resulting in optimized predictions pertaining to virtual objects derived from physical object 410. In some embodiments, analysis of physical object 410 further involves determining a position associated with physical object 410 within physical space 400 relative to user 270, which supports correlating the derived virtual object with the virtual gaming environment based upon the position.

Figure 5:
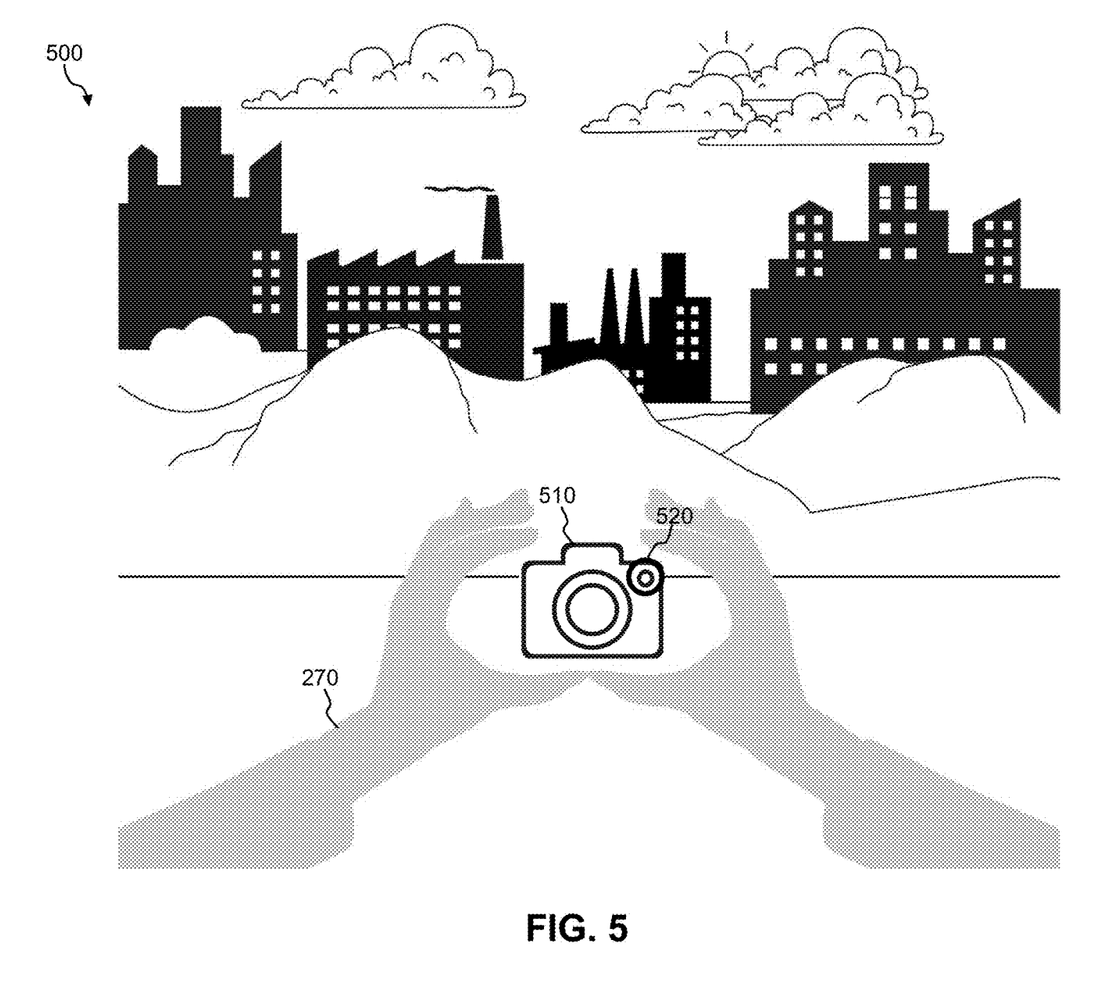
FIG. 5 illustrates a schematic diagram showing a virtual gaming environment including an optimized virtual object as viewed through a computer-mediated reality device, according to an exemplary embodiment.

Referring now to FIG. 5, a virtual gaming environment 500 is depicted, according to an exemplary embodiment. Virtual gaming environment 500 is visualized by visualization module 330 for presentation to user 270 via computing device 260. As depicted, virtual gaming environment 500 comprises virtual object 510 derived from physical object 410 and generated by object optimization module 380 as an in-game feature for utilization for user 270. In some embodiments, virtual object 510 comprises a trigger point 520 configured to receive one or more interactions from user 270 in order to initiate one or more impacts within the gaming experience. Examples of interactions include, but are not limited to touching, shaking, swiping, voice commands, and any other applicable VR/AR based interactions known to those of ordinary skill in the art. Visualization and/or optimization of virtual object 510 into the virtual gaming environment may be based upon one or more factors including, but not limited to gaming context, object profiles, previously rendered virtual object, inherent characteristics of the physical object, and the like.

Figure 6:
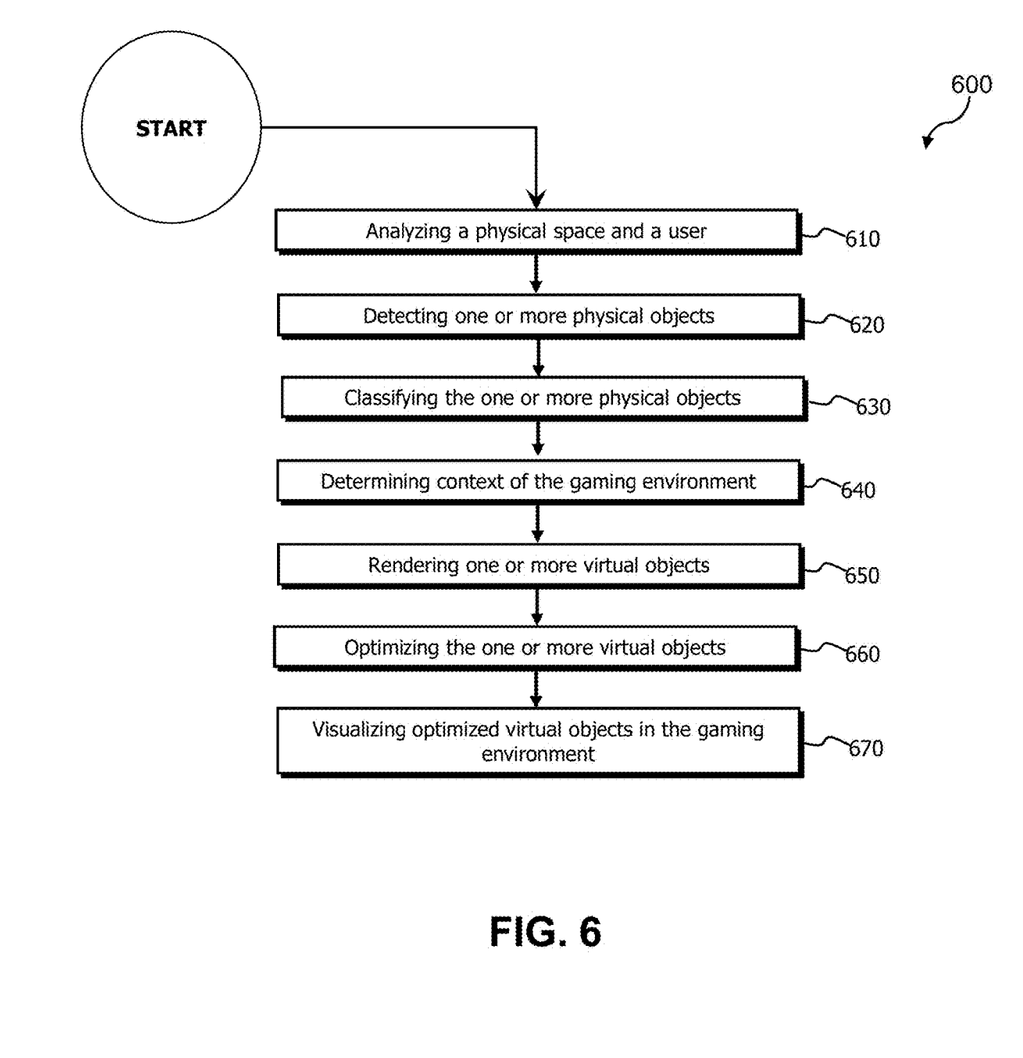
FIG. 6 illustrates a flowchart depicting a method for visualizing gaming virtual objects, according to an exemplary embodiment.

With the foregoing overview of the example architecture, it may be helpful now to consider a high-level discussion of an example process. FIG. 6 depicts a flowchart illustrating a computer-implemented process 600 for visualizing gaming virtual objects, consistent with an illustrative embodiment. Process 600 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

At step 610 of process 600, virtual environment module 220 analyzes the physical space associated with user 270 along with user 270. Applicable data associated with the physical space and/or user 270 may be sourced from one or more sensors associated with computing device 260, a monitoring system, a computer visioning system, or any other applicable data sources relating to visualizing users and virtual environments known to those of ordinary skill in the art. It should be noted that virtual environments may require image/video analysis, parsing, tokenizing, 3D point cloud segmentation, virtual object detection, theme identification, or any other applicable VR/AR-based analysis mechanisms. Various types of data may be taken into account during analyses of the physical space and user 270 including, but not limited to biological data, movement data, LiDAR data, LADAR data, and the like.

At step 620 of process 600, object detection module 320 detects one or more physical objects. In some embodiments, the physical objects are within the vicinity of user 270 and/or computing device 260, in which the position of the physical objects relative to the location of user 270 is taken into consideration for the purpose of correlating virtual objects within the virtual gaming environment based on the position. Object tracking and position monitoring is supported by object detection module 320 in order to assure that orientation, positioning, etc. associated with physical objects is accurately reflected within the generated virtual gaming environment.

At step 630 of process 600, object detection module 320 classifies physical objects in the physical space associated with user 270. In some embodiments, object detection module 320 classifies physical objects based on detection of one or more signals associated with the physical objects (e.g., digital signals, RFID, NFC, etc.), in which if object detection module 320 detects any of the aforementioned then the detected physical object is classified as a smart object. Otherwise, the detected physical object is classified as a non-smart object indicating that the physical device lacks at least one sensor and/or processor. In some embodiments, the virtual object mimics characteristics of the physical object in the virtual environment in which the characteristics may be derived from the classification. For example, the rendered optimization for the virtual object is derived from the smart object (e.g., smart object is an IOT appliance and the virtual object comprises a function of the IOT appliance in the virtual environmnt).

At step 640 of process 600, gaming context module 340 determines a context for the detected physical object. In some embodiments, gaming context module 340 communicates with virtual environment analysis module 310 in order to analyze the applicable virtual gaming environment, which may be accomplished by one or more of image/video analysis, parsing, tokenizing, 3D point cloud segmentation, virtual object detection, theme identification, or any other applicable VR/AR-based analysis mechanisms known to those of ordinary skill in the art.

At step 650 of process 600, virtual gaming module 240 renders the one or more virtual objects. It should be noted that the virtual objects are designed to be integrated into the virtual gaming environment in order to function as components of the gaming experience for user 270 based one or more of gaming environment context, object profile, inherent characteristics of the physical object, user information (e.g., data derived from the wearable device, user profiles, user inputs, etc.), physical surroundings of user 270, and the like.

At step 660 of process 600, object optimization module 380 optimizes the one or more virtual objects. Object optimization module 380 may communicate with machine learning module 360 to utilize GANs in order to render the optimizations to the virtual objects. optimization of a virtual object refers to providing one or more features or functionalities to the virtual object configured to be manifested in the virtual gaming experience of the user. Furthermore, optimization by object optimization module 380 may also comprise adding visual/audio effects to virtual objects including, but not limited to flashing, glowing, talking, and any other applicable virtual object modifications known to those of ordinary skill in the art.

At step 670 of process 600, visualization module 330 visualizes the optimized virtual objects in the applicable virtual gaming environment. In some embodiments, visualization module 330 renders the virtual objects within the gaming experience in a scalable and sustainable manner by referencing applicable virtual objects stored in a digital objects library included within virtual gaming module database 250; thus, reducing the amount of computing resources necessary for visualization module 330 to render individualized virtual objects for respective computing devices that share the gaming experience with user 270.

Based on the foregoing, a method, system, and computer program product have been disclosed. However, numerous modifications and substitutions can be made without deviating from the scope of the present invention. Therefore, the present invention has been disclosed by way of example and not limitation.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-payment devices or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g. light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter payment device or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that, although specific embodiments have been described herein for purposes of illustration, various modifications may be made without departing from the spirit and scope of the embodiments. In particular, transfer learning operations may be carried out by different computing platforms or across multiple devices. Furthermore, the data storage and/or corpus may be localized, remote, or spread across multiple systems. Accordingly, the scope of protection of the embodiments is limited only by the following claims and their equivalent.

What is claimed is:

1. A computer-implemented method for visualizing gaming virtual objects, the method comprising:
   analyzing, by a computing device, a physical object within a physical space,
   wherein analyzing the physical object comprises determining, by the computing device, a gaming context;
   rendering, by the computing device, a virtual object associated with the physical object based on the analysis;
   adjusting and optimizing, by the computing device, the virtual object within a virtual environment associated with the physical space based on the gaming context; and
   integrating, by the computing device, the optimized virtual object into the virtual environment.

2. The computer-implemented method of claim 1, wherein the physical object is within a vicinity of a user operating on an augmented reality-based gaming system and the virtual environment is a virtual gaming environment.

3. The computer-implemented method of claim 1, wherein analyzing the physical object comprises:
   determining, by the computing device, the physical object is a smart object; and
   rendering, by the computing device, at least one optimization for the virtual object derived from the smart object;
   wherein the smart object comprises at least one sensor or processor.

4. The computer-implemented method of claim 1, wherein optimizing the virtual object comprises:
   coupling, by the computing device, the virtual object with the physical object to alter the virtual object in accordance to at least one of shape, size, color, form, and function of the physical object.

5. The computer-implemented method of claim 1, wherein optimizing the virtual object comprises:
   determining, by the computing device, the gaming context associated with the virtual environment; and
   adjusting, by the computing device, the virtual object based on the gaming context.

6. The computer-implemented method of claim 1, wherein the virtual object mimics characteristics of the physical object in the virtual environment.

7. The computer-implemented method of claim 1, wherein analyzing the physical object comprises:
   determining, by the computing device, a position associated with the physical object in the physical space; and
   correlating, by the computing device, the virtual object within the virtual environment based on the position.

8. A computer program product for visualizing gaming virtual objects, the computer program product comprising one or more computer readable storage media and program instructions collectively stored on the one or more computer readable storage media, the stored program instructions comprising:
- program instructions to analyze a physical object within a physical space,
- wherein the program instructions to analyze the physical object comprise program instructions to determine a gaming context;
- program instructions to render a virtual object associated with the physical object based on the analysis;
- program instructions to adjust and optimize the virtual object within a virtual environment associated with the physical space based on the gaming context; and
- program instructions to integrate the optimized virtual object into the virtual environment.

9. The computer program product of claim 8, wherein the physical object is within a vicinity of a user operating on an augmented reality-based gaming system and the virtual environment is a virtual gaming environment.

10. The computer program product of claim 8, wherein the program instructions to analyze the physical object further comprise:
- program instructions to determine the physical object is a smart object; and
- program instructions to render at least one optimization for the virtual object derived from the smart object;
- wherein the smart object comprises at least one sensor or processor.

11. The computer program product of claim 8, wherein the program instructions to optimize the virtual object further comprise:
- program instructions to couple the virtual object with the physical object to alter the virtual object in accordance to at least one of shape, size, color, form, and function of the physical object.

12. The computer program product of claim 8, wherein the program instructions to optimize the virtual object further comprise:
- program instructions to determine the gaming context associated with the virtual environment; and
- program instructions to adjust the virtual object based on the gaming context.

13. The computer program product of claim 8, wherein the virtual object mimics characteristics of the physical object in the virtual environment.

14. The computer program product of claim 8, program instructions to analyze the physical object comprises:
- program instructions to determine a position associated with the physical object in the physical space; and
- program instructions to correlate the virtual object within the virtual environment based on the position.

15. A computer system for visualizing gaming virtual objects, the computer system comprising:
- one or more processors;
- one or more computer-readable memories; and
- program instructions stored on at least one of the one or more computer-readable memories for execution by at least one of the one or more processors, the program instructions comprising:
  - program instructions to analyze a physical object within a physical space,
  - wherein the program instructions to analyze the physical object comprise program instructions to determine a gaming context;
  - program instructions to render a virtual object associated with the physical object based on the analysis;
  - program instructions to adjust and optimize the virtual object within a virtual environment associated with the physical space based on the gaming context; and
  - program instructions to integrate the optimized virtual object into the virtual environment.

16. The computer system of claim 15, wherein the physical object is within a vicinity of a user operating on an augmented reality-based gaming system and the virtual environment is a virtual gaming environment.

17. The computer system of claim 15, wherein the program instructions to analyze the physical object further comprise:
- program instructions to determine the physical object is a smart object; and
- program instructions to render at least one optimization for the virtual object derived from the smart object,
- wherein the smart object comprises at least one sensor or processor.

18. The computer system of claim 15, wherein the program instructions to optimize the virtual object further comprise:
- program instructions to couple the virtual object with the physical object to alter the virtual object in accordance to at least one of shape, size, color, form, and function of the physical object.

19. The computer system of claim 15, wherein program instructions to optimize the virtual object further comprise:
- program instructions to determine the gaming context associated with the virtual environment; and
- program instructions to adjust the virtual object based on the gaming context.

20. The computer system of claim 15, wherein the program instructions to analyze the physical object comprises:
- program instructions to determine a position associated with the physical object in the physical space; and
- program instructions to correlate the virtual object within the virtual environment based on the position.

* * * * *